United States Patent
Chung et al.

(10) Patent No.: US 10,177,646 B2
(45) Date of Patent: Jan. 8, 2019

(54) POWER FACTOR CORRECTION CIRCUIT FOR A POWER ELECTRONIC SYSTEM

(71) Applicant: City University of Hong Kong, Kowloon (HK)

(72) Inventors: Shu Hung Henry Chung, Mid-levels (HK); Kuen Faat Yuen, New Territories (HK); Wing To Fan, New Territories (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 615 days.

(21) Appl. No.: 14/304,339

(22) Filed: Jun. 13, 2014

(65) Prior Publication Data

US 2015/0364989 A1    Dec. 17, 2015

(51) Int. Cl.
*H02M 1/42*    (2007.01)
*H02M 1/12*    (2006.01)
*H02M 1/00*    (2006.01)

(52) U.S. Cl.
CPC ........... *H02M 1/12* (2013.01); *H02M 1/4225* (2013.01); *H02M 2001/007* (2013.01); *H02M 2001/0045* (2013.01); *Y02B 70/126* (2013.01)

(58) Field of Classification Search
CPC ........... H02M 1/12; H02M 2001/0045; H02M 2001/0087; H02M 2001/007; G05F 1/462; G05F 1/563; G05F 1/59; G05F 1/565

See application file for complete search history.

(56) References Cited

U.S. PATENT DOCUMENTS

| | | | | |
|---|---|---|---|---|
| 4,881,023 A * | 11/1989 | Perusse | .................... | G01S 7/282 323/266 |
| 5,132,893 A * | 7/1992 | Klein | ...................... | G05F 1/563 323/901 |
| 5,430,364 A * | 7/1995 | Gibson | ..................... | G05F 1/70 323/207 |
| 5,436,550 A * | 7/1995 | Arakawa | ............. | H02M 1/4225 323/222 |
| 5,602,463 A * | 2/1997 | Bendall | ..................... | G05F 1/62 323/266 |
| 5,642,267 A * | 6/1997 | Brkovic | ................... | G05F 1/613 323/224 |
| 6,075,352 A * | 6/2000 | Kates | ................ | H02M 3/33592 323/266 |
| 6,344,986 B1 * | 2/2002 | Jain | ..................... | H02M 1/4225 363/21.12 |
| 6,850,044 B2 * | 2/2005 | Hansen | ................. | H02M 3/156 323/266 |
| 7,038,430 B2 * | 5/2006 | Itabashi | ................ | H02M 3/156 323/224 |

(Continued)

*Primary Examiner* — Yusef A Ahmed
(74) *Attorney, Agent, or Firm* — Renner Kenner Greive Bobak Taylor & Weber

(57) ABSTRACT

A power factor correction circuit for a power electronic system includes a series-pass device arranged to control an input characteristic of a power converter, and a control mechanism arranged to control an operation of the series-pass device during a power conversion process. The correction circuit increases a power factor of the power electronic system and/or reduces a harmonic distortion generated by the power converter to an electrical current supplied by a power source in the power electronic system.

21 Claims, 13 Drawing Sheets

(56) References Cited

U.S. PATENT DOCUMENTS

| | | | | |
|---|---|---|---|---|
| 7,053,592 B2* | 5/2006 | Pihet | G05F 1/575 | 323/266 |
| 7,183,756 B1* | 2/2007 | Dikken | G01R 19/0092 | 323/280 |
| 7,719,248 B1* | 5/2010 | Melanson | H02M 1/4225 | 323/222 |
| 7,759,914 B2* | 7/2010 | Odell | H02M 3/1588 | 323/225 |
| 7,859,872 B1* | 12/2010 | Johns | H02M 1/4208 | 323/207 |
| 8,154,262 B2* | 4/2012 | Kanayama | H02M 3/158 | 323/266 |
| 8,847,571 B2* | 9/2014 | Kielb | G05B 19/0423 | 323/224 |
| 9,087,656 B1* | 7/2015 | Vinciarelli | H01H 9/54 | |
| 9,735,670 B2* | 8/2017 | Wu | H02M 1/4225 | |
| 9,748,844 B2* | 8/2017 | Ramabhadran | H02M 3/1582 | |
| 2002/0130645 A1* | 9/2002 | Tsai | G05F 1/24 | 323/274 |
| 2005/0013143 A1* | 1/2005 | Kim | H02M 1/4225 | 363/20 |
| 2005/0057300 A1* | 3/2005 | Ishii | H02M 3/07 | 327/536 |
| 2005/0275387 A1* | 12/2005 | Mitter | H02M 1/15 | 323/266 |
| 2006/0158912 A1* | 7/2006 | Wu | H02M 1/4225 | 363/89 |
| 2007/0145956 A1* | 6/2007 | Takeuchi | H02M 1/4225 | 323/207 |
| 2008/0310201 A1* | 12/2008 | Maksimovic | H02M 3/1584 | 363/85 |
| 2009/0096436 A1* | 4/2009 | Sugahara | H02M 3/158 | 323/282 |
| 2009/0146618 A1* | 6/2009 | Adragna | G05F 1/70 | 323/205 |
| 2010/0014326 A1* | 1/2010 | Gu | H02M 1/14 | 363/45 |
| 2010/0110739 A1* | 5/2010 | Nishikawa | H02M 1/4225 | 363/124 |
| 2010/0164289 A1* | 7/2010 | Umminger | H02J 1/10 | 307/55 |
| 2010/0302818 A1* | 12/2010 | Chang | H02M 1/4225 | 363/80 |
| 2010/0329293 A1* | 12/2010 | Taubman | B82Y 20/00 | 372/38.02 |
| 2012/0086422 A1* | 4/2012 | Ito | H02M 3/156 | 323/284 |
| 2014/0252950 A1* | 9/2014 | Kikuchi | H05B 33/0815 | 315/77 |
| 2014/0253074 A1* | 9/2014 | Tuten | H02M 1/4225 | 323/282 |
| 2015/0102786 A1* | 4/2015 | Kim | H02M 1/4225 | 323/208 |
| 2015/0146458 A1* | 5/2015 | Lim | H02M 3/158 | 363/44 |
| 2015/0263614 A1* | 9/2015 | Bansal | G01R 19/2506 | 323/282 |
| 2015/0288275 A1* | 10/2015 | Jitaru | H02M 1/4208 | 363/126 |
| 2015/0362933 A1* | 12/2015 | Chung | G05F 1/56 | 323/266 |
| 2015/0364991 A1* | 12/2015 | Chung | H02M 1/44 | 323/301 |
| 2016/0056770 A1* | 2/2016 | Delepaut | H02M 3/158 | 330/297 |

* cited by examiner

POWER FACTOR CORRECTION CIRCUIT FOR A POWER ELECTRONIC SYSTEM

TECHNICAL FIELD

The present invention relates to a power factor correction circuit for a power electronic system, and particularly, although not exclusively, to a power semiconductor filter for power factor correction in a power electronic system.

BACKGROUND

Electrical apparatus and electronic devices such as computers and mobile phones may operate at different operating voltages from an electrical source. Accordingly, electrical power is required to be stepped up or down to a suitable operating voltage for different electronic devices. Each of these apparatus or devices may comprise different operating modules which operate at different operating voltages, hence multiple power converters may be also included in these apparatus or devices.

In these electronic devices, power converters such as switching converters may be used to convert the electrical power to a required operating voltage. During the power conversion process, switches in the switching converters may be turned on and off periodically, and hence current ripples are induced in the switching converter. Such operation may also reduce the power factor of the electronic devices, and more seriously, introducing a significant harmonic distortion to the power source. Hence correction circuits may be placed between the power converters and the power sources to improve the performance of the power electronic system.

SUMMARY OF THE INVENTION

In accordance with a first aspect of the present invention, there is provided a power factor correction circuit for a power electronic system comprising: a series-pass device arranged to control an input characteristic of a power converter; and a control mechanism arranged to control an operation of the series-pass device during a power conversion process, so as to increase a power factor of the power electronic system and/or to reduce a harmonic distortion generated by the power converter to an electrical current supplied by a power source in the power electronic system.

In an embodiment of the first aspect, the input characteristic of the power converter includes an input current waveform of the power converter.

In an embodiment of the first aspect, the series-pass device is connected in series with an input of the power converter.

In an embodiment of the first aspect, the series-pass device is a bipolar junction transistor.

In an embodiment of the first aspect, the series-pass device is arranged to operate in an active region of a current-voltage characteristic of the series-pass device.

In an embodiment of the first aspect, an operating point of the series-pass device is regulated at boundaries between an active region and a saturation region of a current-voltage characteristic of the series-pass device.

In an embodiment of the first aspect, the control mechanism is a feedback mechanism arranged to receive an output voltage of the power converter and to generate an input signal for the series-pass device so as to control the input characteristic of the power converter.

In an embodiment of the first aspect, the feedback mechanism includes a first error amplifier arranged to compare the output voltage of the power converter with a first reference voltage.

In an embodiment of the first aspect, the first reference voltage equals to a predetermined output voltage of the power converter.

In an embodiment of the first aspect, the feedback mechanism further comprises a second error amplifier arranged to compare the input current with a reference input current obtained by multiplying an output of the first error amplifier with a sensed input voltage of the power converter.

In an embodiment of the first aspect, the first error amplifier and/or the second error amplifier is a proportional-plus-integral controller.

In an embodiment of the first aspect, an input capacitor is connected in parallel to the power converter arranged to absorb a high-frequency current pulse generated by the power converter.

In an embodiment of the first aspect, the input capacitor is a film type capacitor In an embodiment of the first aspect, the input characteristic of the power converter includes an input voltage of the power converter.

In an embodiment of the first aspect, further comprising a voltage controller arranged to sense a voltage across the series-pass device, and to control the input voltage of the power converter.

In an embodiment of the first aspect, the voltage controller includes a voltage comparator arranged to compare the sensed voltage across the series-pass device with a second reference voltage, and to output an error voltage to a switch driver arranged to control the input voltage of the power converter.

In an embodiment of the first aspect, the second reference voltage is slightly greater than a saturation voltage of the series-pass device.

In an embodiment of the first aspect, the switch driver is also arranged to control a switching frequency and/or a duty cycle of the input voltage of the power converter.

In an embodiment of the first aspect, the power converter is a DC-DC converter.

In an embodiment of the first aspect, the power converter is a switching converter.

In an embodiment of the first aspect, the power converter is a boost converter.

In an embodiment of the first aspect, the boost converter operates at a discontinuous conduction mode.

In accordance with a second aspect of the present invention, there is provided an electrical power switching converter, comprising: a switching network arranged to process an input electrical power between an electrical power source and an electrical load; a power factor correction circuit in accordance with claim 1, wherein the series-pass device is connected in series between an input of the switching network and the electrical power source; and an output filter connected between the electrical load and the switching network.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that, the switching mode power supplies are widely used various applications because of their high power efficiency. According to the harmonic regulation, the power factor correction for the switching mode power supply to achieve a high power factor (PF) and low harmonic distortion is highly recommended. Also, the active power factor correction (PFC) circuits are more preferred than the passive PFC circuit as their high energy efficiency and low harmonic distortion.

Figure 1:
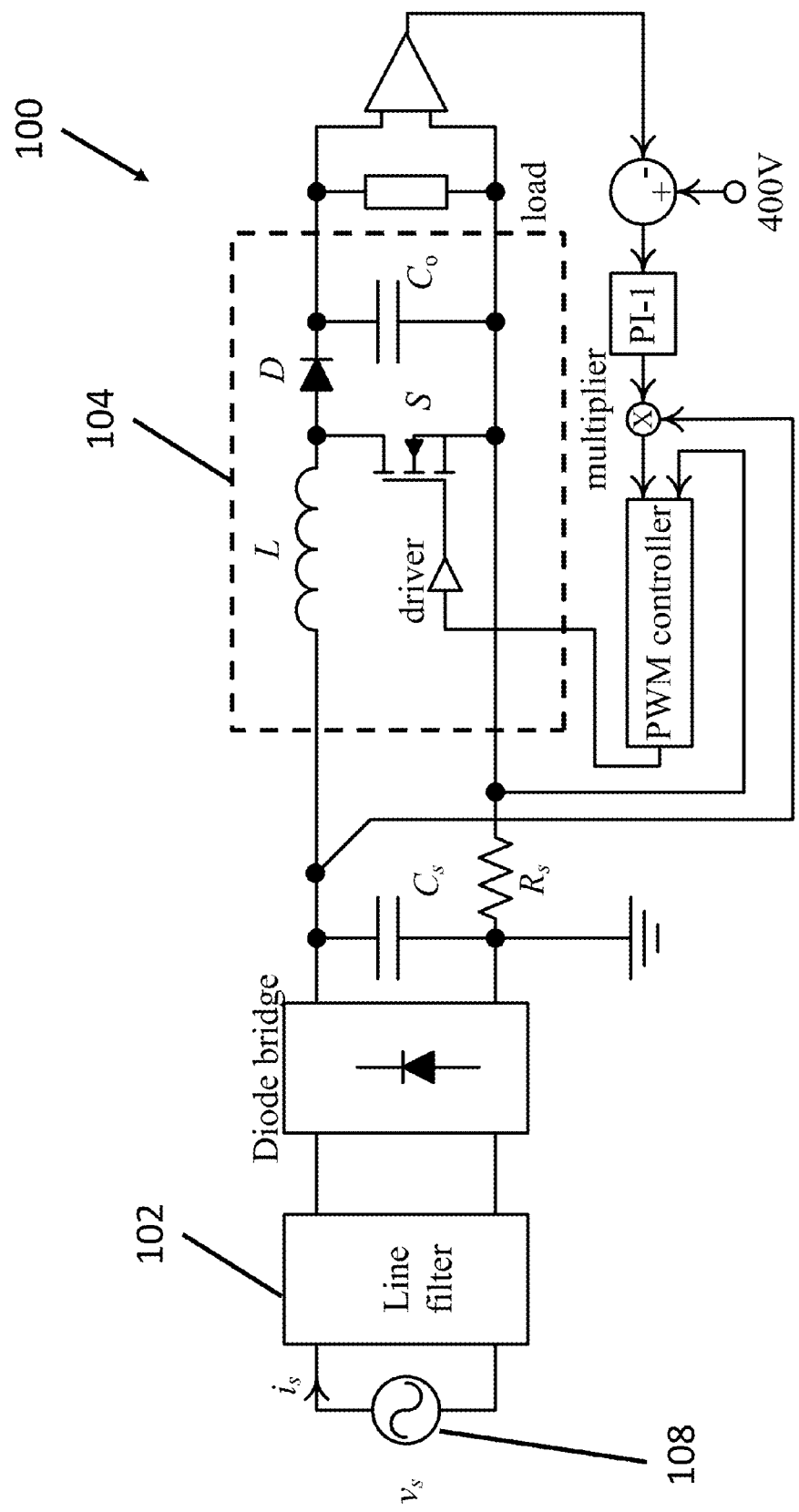
FIG. 1 is a schematic diagram illustrating an example of a power factor correction circuit for a power electronic system.

With reference to FIG. 1, there is shown a boost type PFC converter. As there is generally a large input current ripple induced by the boost converter 104, a line filter 102 (usually comprises of passive components such as inductors and capacitors) may be used to connect between the source 108 and the converter 104 and to reduce the current ripple. The input current ripple of the boost converter 104 at discontinuous conduction mode (DCM) is much larger than that at the continuous conduction mode (CCM). Hence the need of the current ripple filtering is increased when the power converter 104 operates at DCM. As a result, a large size line filter 102 is required.

Other than using a large filter to reduce the input current ripple, the interleaving boost PFC topology may be introduced to reduce the current ripple by using the inductor current ripples cancellation technique. Although it can improve the input current ripple performance, it is unable to fully cancel the current ripple at different operation conditions. Besides, the ripple cancellation techniques, which require additional inductors, may be adopted to theoretically cancel the ripples. The additional inductors will reduce the power density of the converters.

Figure 2:
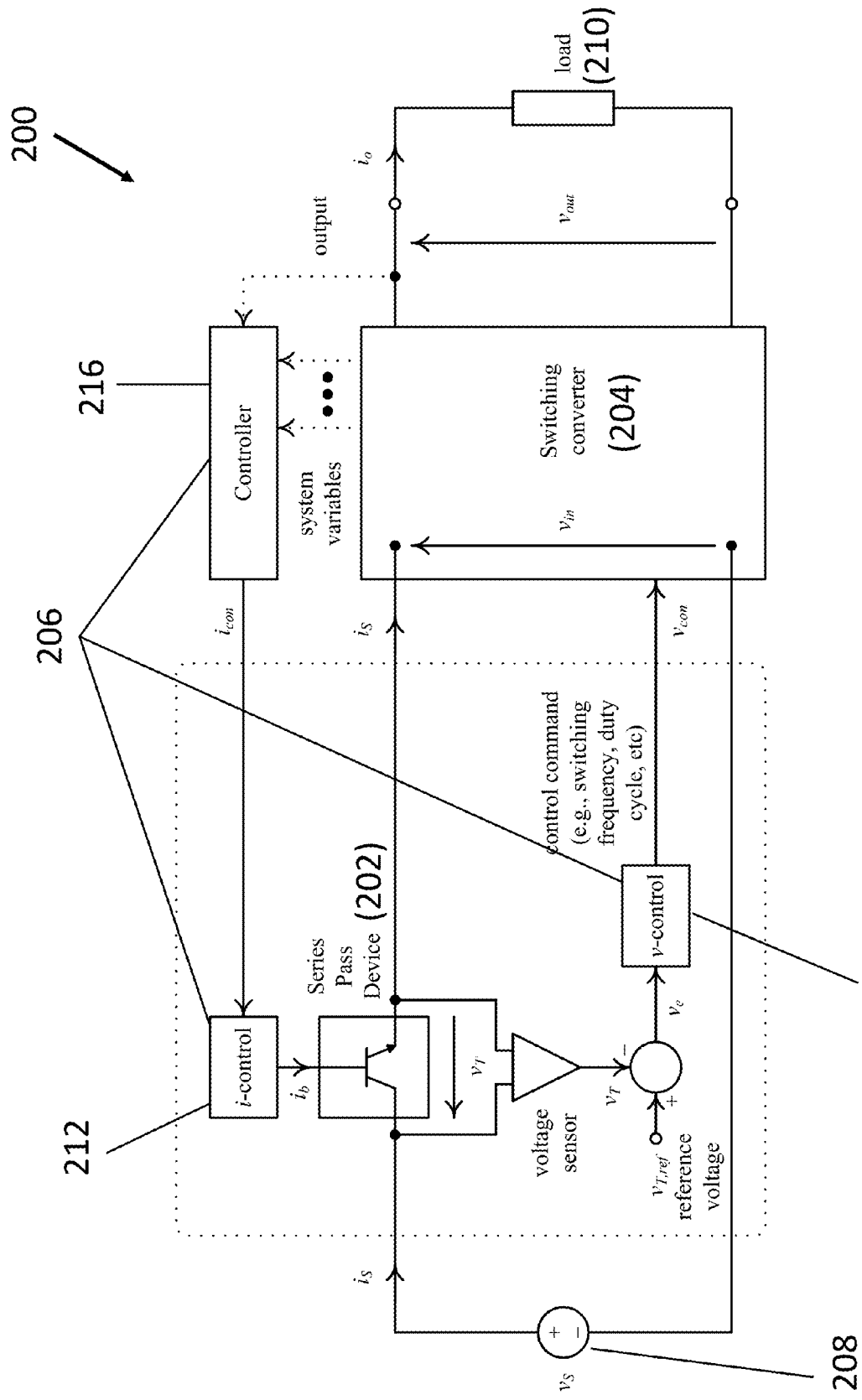
FIG. 2 is a schematic diagram illustrating a power factor correction circuit for a power electronic system in accordance with one embodiment of the present invention.

With reference to FIG. 2, there is shown an embodiment of a power factor correction circuit for a power electronic system 200 comprising: a series-pass device 202 arranged to control an input characteristic of a power converter 204; and a control mechanism 206 arranged to control an operation of the series-pass device 202 during a power conversion process, so as to increase a power factor of the power electronic system 200 and/or to reduce a harmonic distortion generated by the power converter 204 to an electrical current supplied by a power source 208 in the power electronic system 200.

In this embodiment, the power electronic system 200 comprises a power converter 204 which is a switching converter, or it may be other DC-DC converters such as a buck converter, a boost converter or a buck-boost converter for processing and converting the input power to a form suitable for the electrical load 210, or the power converter is an AC-DC converter further comprises a diode bridge or a diode rectifier for a first stage AC-DC conversion. During operation, switches in the switching converters 204 may be turned on and off periodically, and hence current ripples are induced in the switching converter 204. Such operation may also reduce the power factor (PF) of the electronic devices 200, and more seriously, introducing a significant harmonic distortion to the power source 208, which alter the harmonic of the sinusoidal waveform of the input current. Hence a power factor correction circuit is necessary in a power electronic system 200 to improve the power factor of the power electronic system 200, and to reduce the total harmonic distortion (THD) of the input current of the power source 208. Preferably, the series-pass device 202 (SPD) in the power factor correction circuit is a bipolar junction transistor (BJT), and the BJT 202 is controlled by a control mechanism 206 during operation, in which the BJT 202 is regulated to operate in the active region of the current-voltage characteristics of the BJT 202.

Preferably, the SPD or the BJT 202, is connected in series with the switching converter 204. The operating point of the SPD 202 is regulated at the boundary between the active and the saturation regions by a control mechanism 206, which comprises two controllers: "i-control" 212 and "v-control" 214. The "i-control" 212 has its input $i_{con}$ connected to the output of a controller 216 for regulating the system output, such as the output voltage $v_{out}$, and has its output $i_b$ to control the input current $i_S$. Hence, the input current waveform of the power converter 204 is controlled by the SPD 202 controlled by the control mechanism 206.

The input of the "v-control" 214 is the error $v_e$ between the voltage $v_T$ across the SPD 202 and a reference voltage $v_{T,ref}$. Preferably, $V_{T,ref}$ is set at slightly higher than the saturation voltage (e.g. less than 1V), so as to reduce the power dissipation in the SPD 202. The output of the "v-control" 214, $v_{con}$, is used to control the input voltage of the switching converter 204 $V_{in}$ by changing some control variables, such as the switching frequency and duty cycle of the switches in the switching converter 204. With this feedback mechanism 206, $i_S$ has low noise and the power dissipation of the SPD 202 is kept low.

Figure 3A:
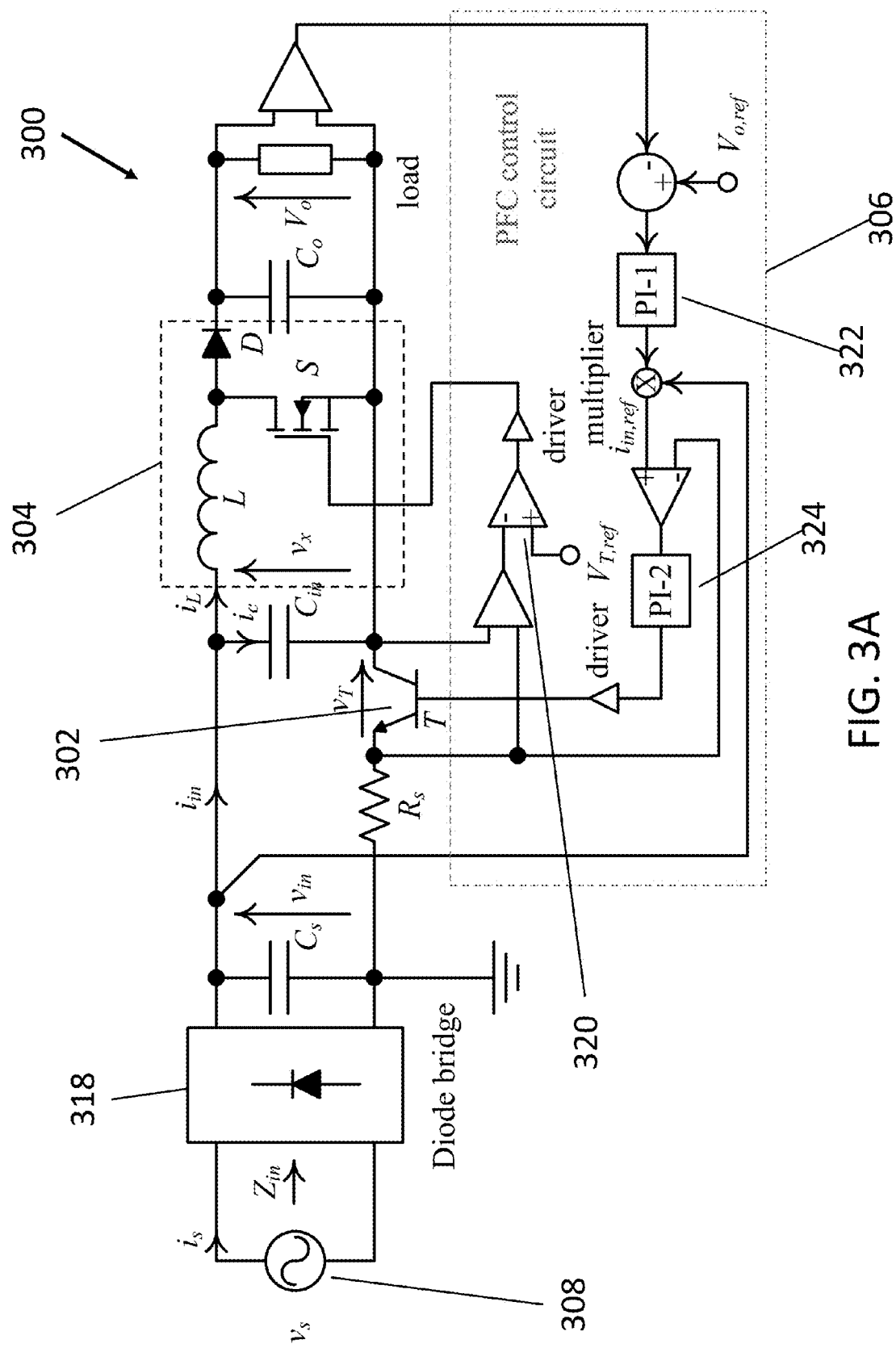
FIG. 3A is a schematic diagram illustrating a power factor correction circuit for a power electronic system in accordance with another embodiment of the present invention.
Figure 3B:
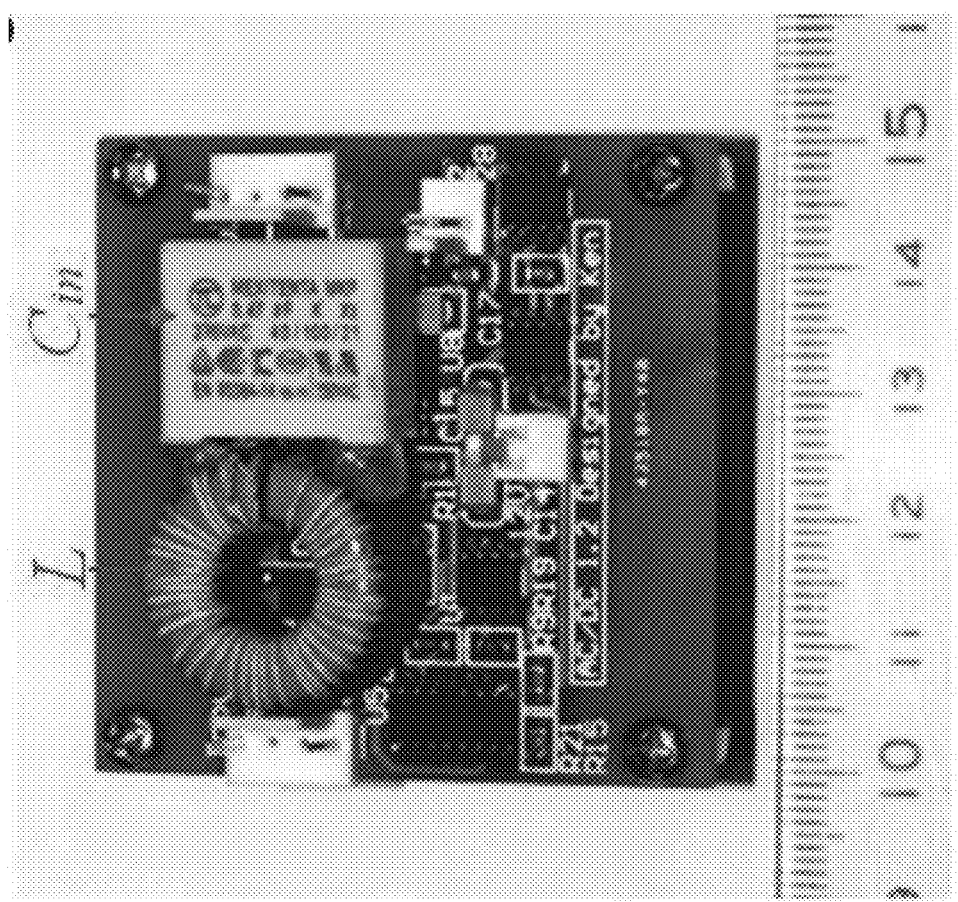
FIG. 3B is photographic image of a power factor correction circuit for a power electronic system of FIG. 3A.

With reference to FIGS. 3A and 3B, there is shown an embodiment of a power factor correction circuit for a power electronic system 300 comprising: a series-pass device 302 arranged to control an input characteristic of a power converter 304; and a control mechanism 306 arranged to control an operation of the series-pass device 302 during a power conversion process, so as to increase a power factor of the power electronic system 300 and/or to reduce a harmonic distortion generated by the power converter 304 to an electrical current supplied by a power source 308 in the power electronic system 300.

In this embodiment, the power converter 304 is a boost DC-DC converter, with a diode bridge 318 connected to an AC power source 308 to perform AC-DC power conversion. The power converter 304 operates in DCM, and alternatively, it may also operate in CCM in some other embodiments. The power electronic system 300 further comprises an input capacitor $C_{in}$. The power factor correction circuit of the present invention, which may also known as a power semiconductor filter (PSF), includes a BJT T (302). $C_{in}$ is connected in parallel with the input of the power converter 304, while T is connected in series with the input of the power converter 304. $C_{in}$ is used to absorb the high-frequency current pulses generated by the boost converter 304, so as to make the input current of the entire system $i_s$ constant.

The voltage across T, $v_T$, is sensed and compared with a reference voltage $V_{T,ref}$ (the second reference voltage, which is 0.7V in this embodiment), by a voltage comparator 320. If $v_T<V_{T,ref}$ MOSFET S will be turned on by the MOSFET driver and D is off, in order to reduce the voltage across $C_{in}$. Conversely, if $v_T>V_{T,ref}$, MOSFET S will be turned off and D1 is on, in order to increase the voltage across $C_{in}$. This bang-bang control mechanism is an example of the "v-control" block 214 in FIG. 2 for regulating $v_T$ at $v_{T,ref}$.

The output voltage $V_a$ is regulated by a feedback loop. It is sensed and compared with a first reference voltage $V_{a,ref}$ (a predetermined output voltage of the power converter 304) by an error amplifier 322, which is a proportional-plus-integral (PI) controller. The output of the error amplifier 322 multiply with the sensed input voltage to generates the input current reference The input current is sensed and compared with by another PI controller 324 (or error amplifier) to generate the signal to the base current $i_b$ of T to control $i_{in}$. This forms the feedback control of the "i-control" block 212 in FIG. 2. Comparing FIG. 3 with FIG. 1, there are no significant changes in the circuit structure, except that a line filter 102 is omitted in the input stage of the power electronic system 100.

Figure 4:
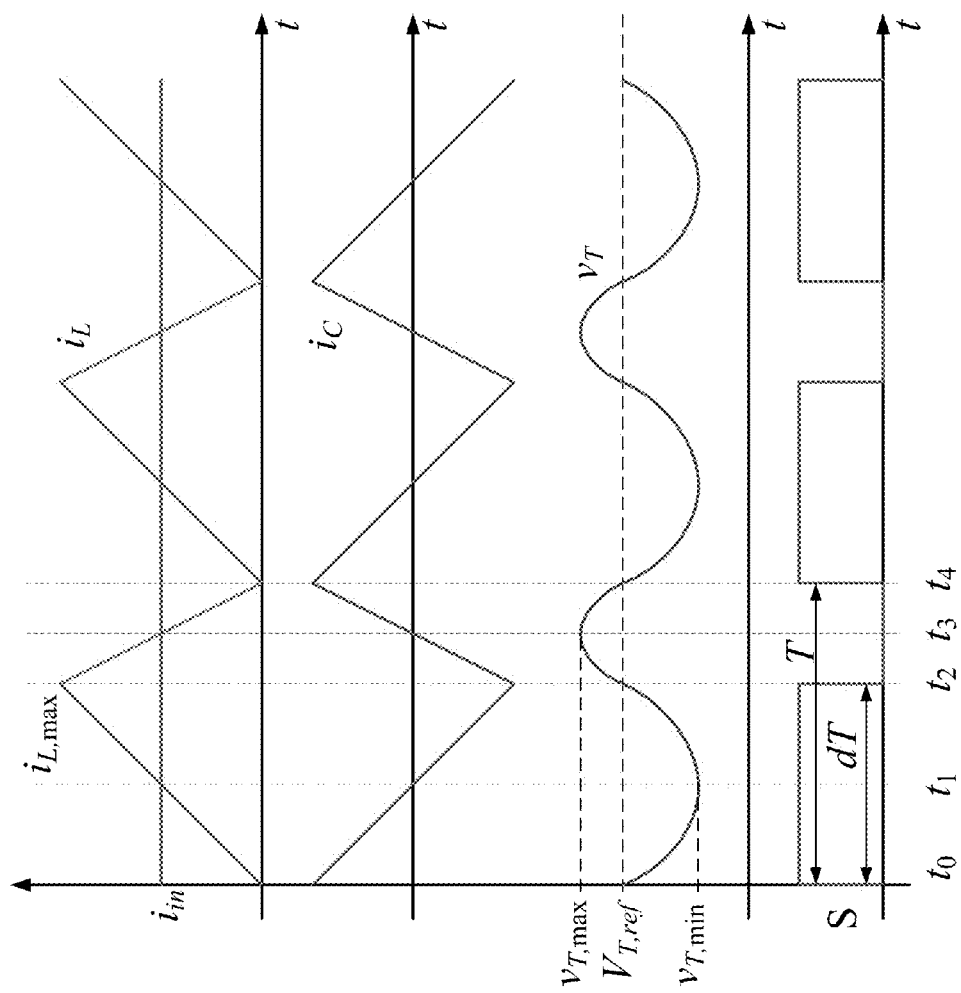
FIG. 4 is a plot showing the key operation waveforms of the power electronic system of FIG. 3A.

With reference to FIG. 4, there is shown the key operation waveforms of the PFC circuit, which operates in DCM. The operational parameters are defined in the following table, in which f is the switching frequency, d is the duty cycle of S, $v_{T,max}$ and $v_{T,min}$ are the maximum and minimum voltage of $v_T$, $i_{L,max}$ is the peak value of the inductor current $i_L$, $Z_{in}$ is the input impedance of the PFC converter, $P_{in}$ is the input power of the PFC converter and $v_{s,rms}$ is the RMS value of the source voltage.

| Parameter | Equation |
|---|---|
| f | $\dfrac{v_{in}(V_o - v_{in})}{2i_{in}LV_o}$ |
| d | $\dfrac{V_o - v_{in}}{V_o}$ |

-continued

| Parameter | Equation |
|---|---|
| $v_{T,max}$ | $V_{T,ref} + \dfrac{i_{in}^2 L}{2C_{in}(V_o - v_{in})}$ |
| $v_{T,min}$ | $V_{T,ref} - \dfrac{i_{in}^2 L}{2C_{in} v_{in}}$ |
| $i_{L,max}$ | $2i_{in}$ |
| $i_{in}$ | $\dfrac{v_{in}}{Z_{in}}$ |
| $Z_{in}$ | $\dfrac{v_{s,rms}^2}{P_{in}}$ |

These embodiments are advantageous in that, the power factor correction circuit is semiconductor-based, the SPD is also capable to filter a noise signal generated by the power converter from reaching the power source of the power electronic system, hence extra passive filters are not required for input current filtering. The physical size can be significantly reduced as compared with passive filter such as an inductor-capacitor (LC) filter, a low-pass filter or a large line filter.

Advantageously, since the power factor correction circuit is semiconductor-based, the power factor correction circuit may comprise a monolithically integrated structure. For example, this allows the power factor correction circuit to be packaged as an integrated circuit chip, or the power factor correction circuit may be integrated to the switching network of the switching converter. As a result, the power density of the power conversion circuit is increased.

Advantageously, the power factor correction circuit of the present invention has a high efficiency, and the power electronic system with the power factor correction circuit has a very high power factor and low THD at different output power, which will be described below.

The power factor correction circuit as shown in FIGS. 3A and 3B may operate in a power electronic system including a 220V/50 Hz AC to 380V DC converter. In this example embodiment, the AC voltage source $v_S$ is 220V/50 Hz and the output voltage $V_o$ is set at 380V. The reference voltage for $v_T$, $V_{T,ref}$ is 0.7V. The values of the components are shown in the following table. A resistor is used as the load for the PFC converter. The driving power of the PFC converter under full load condition is 0.87 W.

| Parameter | Value |
|---|---|
| $C_s$ | 0.22 µF |
| $C_{in}$ | 1 µF |
| L | 50 µH |
| $C_o$ | 44 µF |
| S | FDPF18N50 |
| T | TIP41C |
| D | C3D04060E |

Figure 5A:
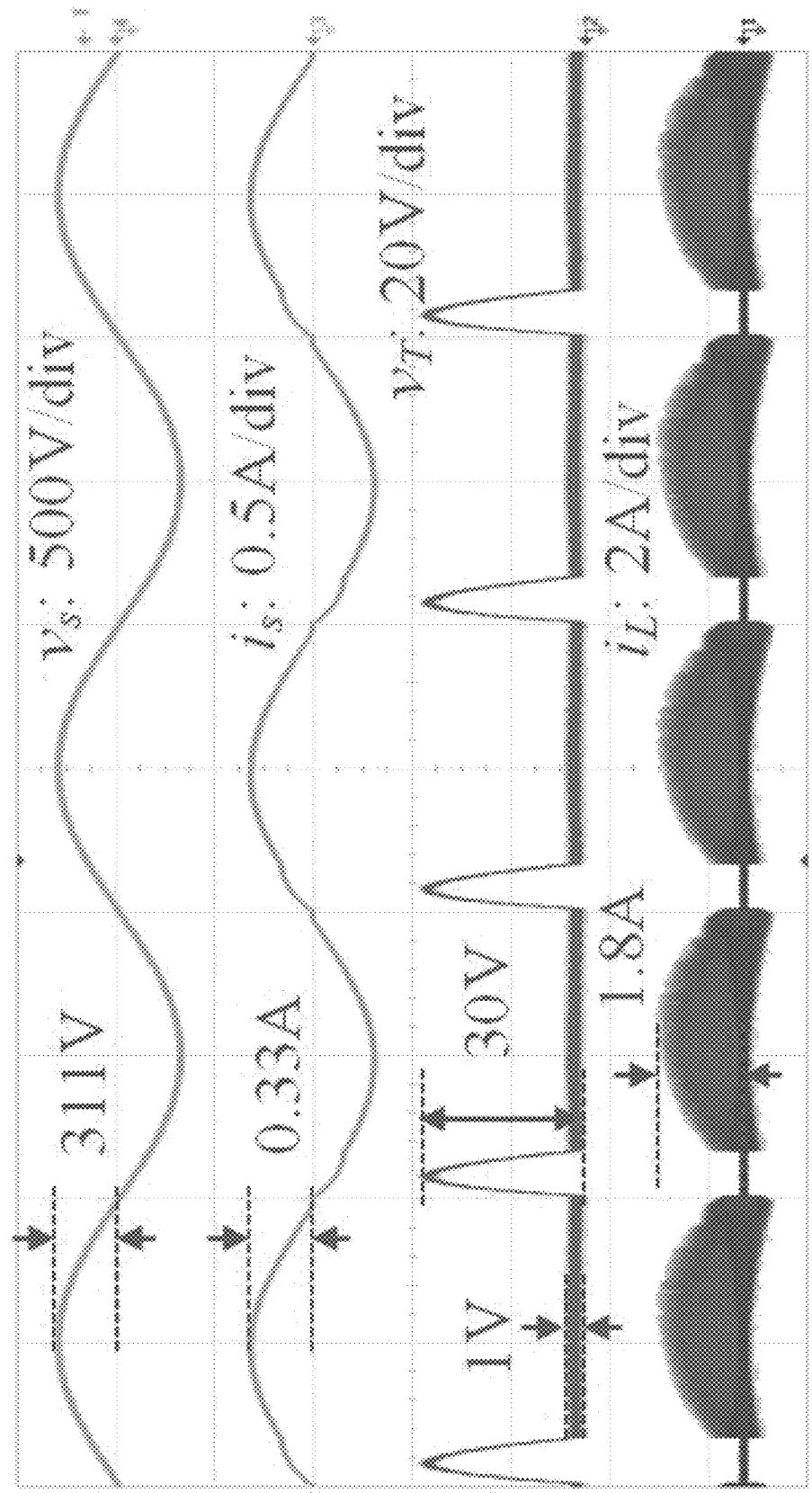
FIG. 5A is a plot showing the waveforms of $i_S$, $v_s$, $v_T$ and $i_L$ of the power electronic system of FIG. 3B during a power conversion process with 50 W output power.
Figure 5B:
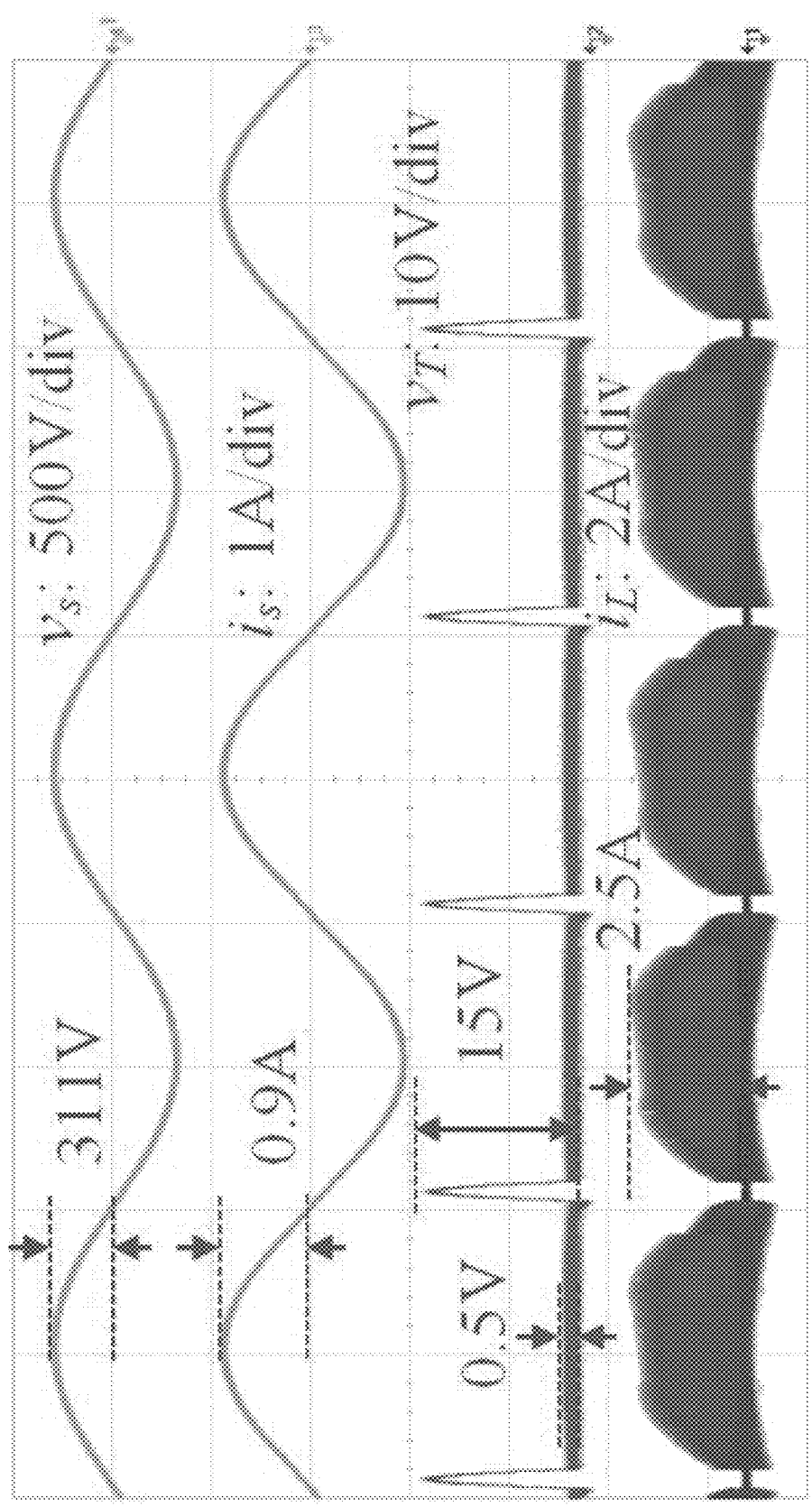
FIG. 5B is a plot showing the waveforms of $i_S$, $v_s$, $v_T$ and $i_L$ of the power electronic system of FIG. 3B during a power conversion process with 150 W output power.

With reference to FIGS. 5A and 5B, there is shown the waveforms of $v_S$, $i_s$, the voltage across the SPD $v_T$ and $i_L$ with 50 W and 150 W output power respectively. The ripple of the input current is effectively eliminated with the PSF. During each switching cycle, at most of the time the average value of $v_T$ is about 0.7V. Although the peak value of $v_T$ is 30V at 50 W load and 15V at 150 W, the current through the transistor (SPD) is very small among the high voltage range. They reveal that the power loss on the SPD is very small.

Figure 6A:
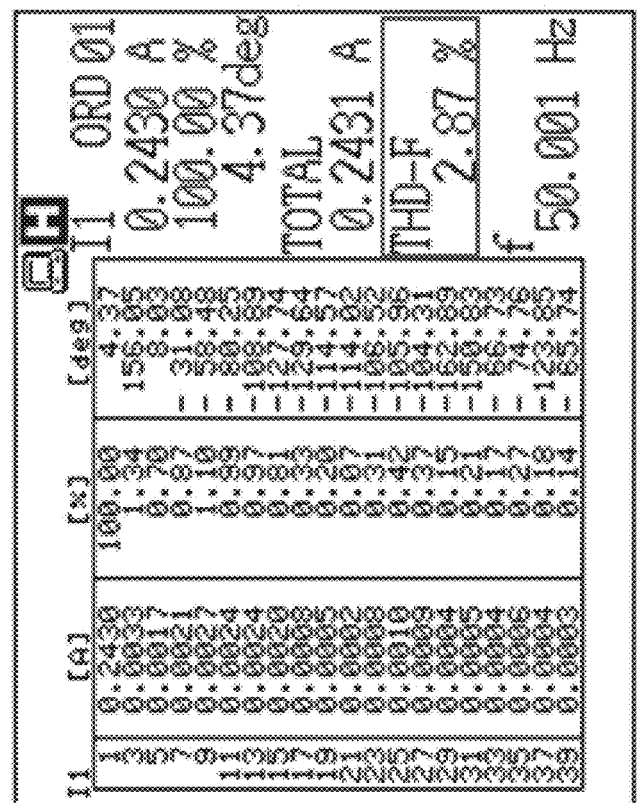
FIG. 6A is a table showing the power factor and the total harmonic distortion of the input current of the power electronic system of FIG. 3B during a power conversion process with 50 W output power.
Figure 6A:
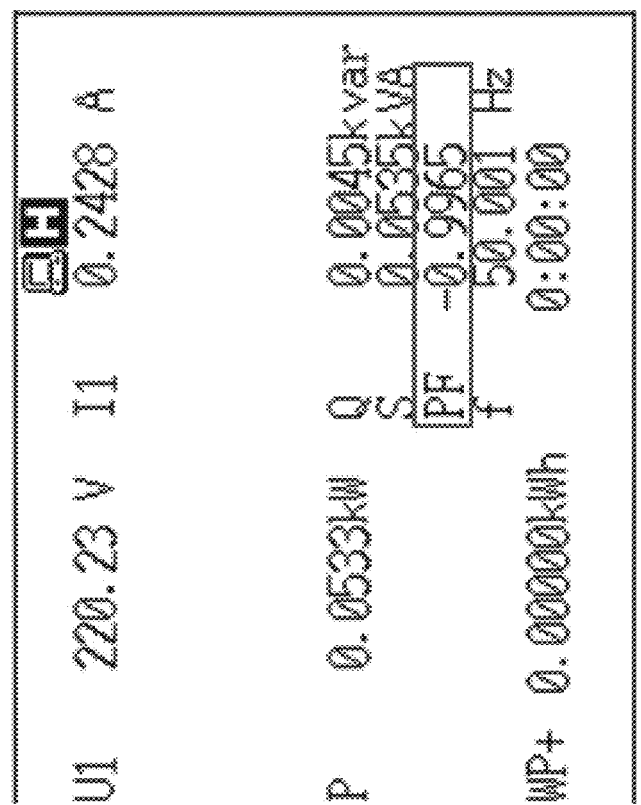
Figure 6B:
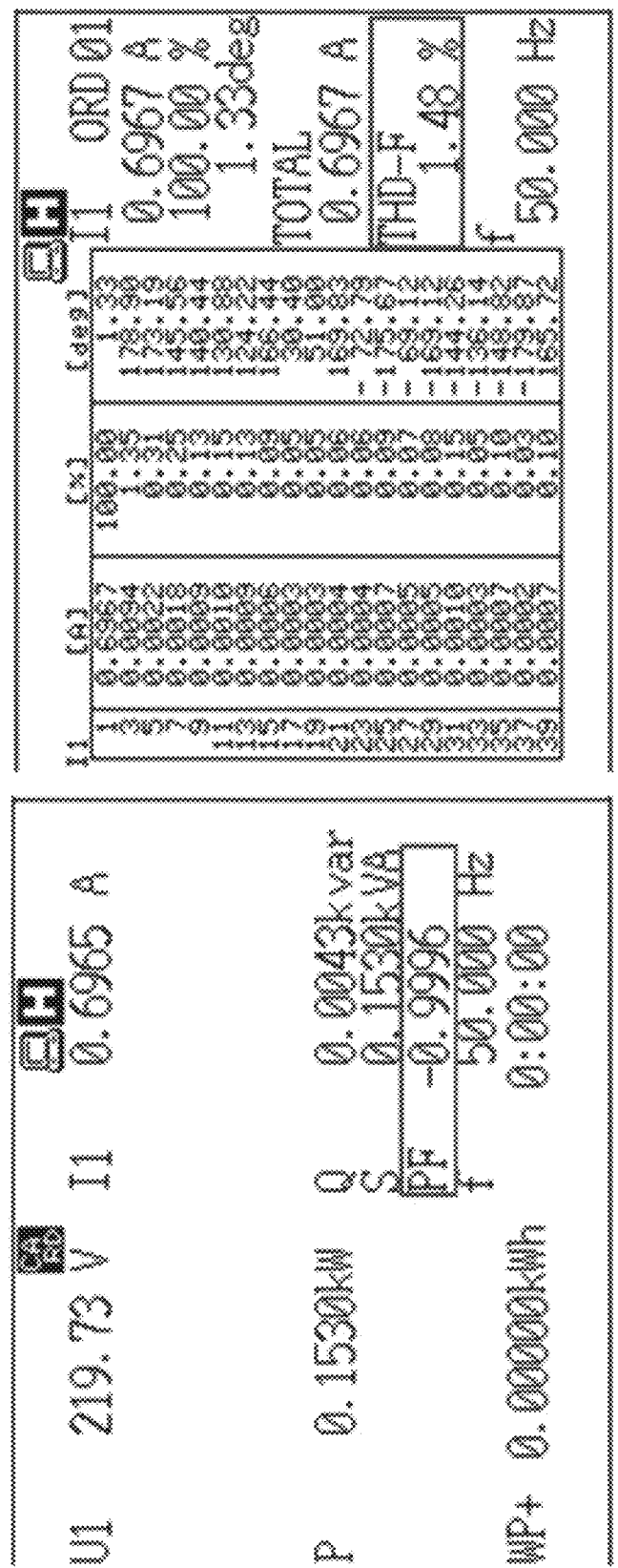
FIG. 6B is a table showing the power factor and the total harmonic distortion of the input current of the power electronic system of FIG. 3B during a power conversion process with 150 W output power.

FIGS. 6A and 6B show the power factor and input current harmonic at 50 W and 150 W load. The power converter with PFC converter provides a very high power factor at both loading condition, which are −0.9965 and −0.9996 at 50 W and 150 W load respectively. Also, the total harmonic distortion (THD) of input current are only 2.87% at 50 W load and 1.48% at 150 W.

Figure 7A:
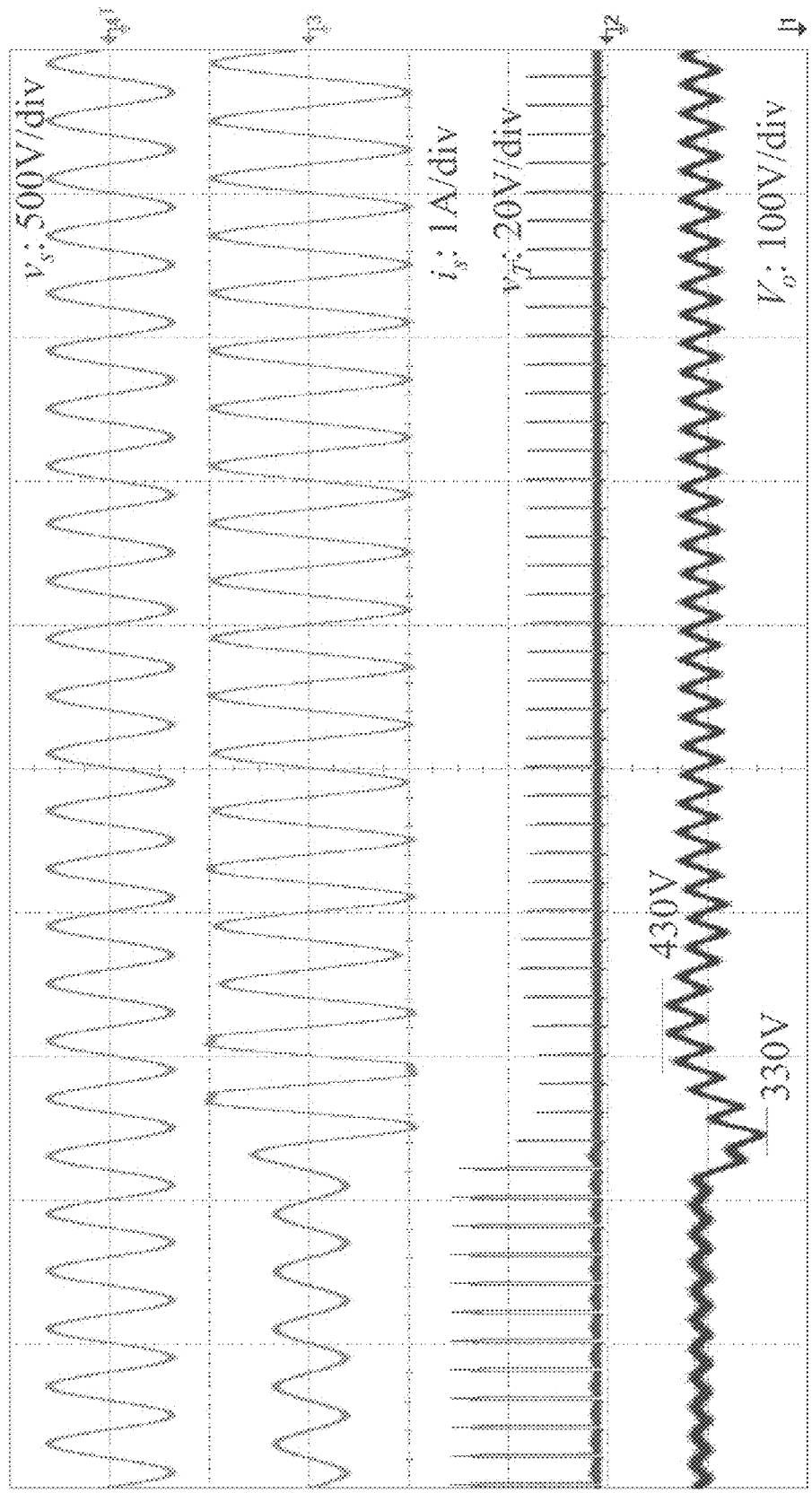
FIG. 7A is a plot showing the waveforms and the transient response of $i_S$, $v_s$, $v_T$ and $v_o$ of the power electronic system of FIG. 3B during a power conversion process when the load power is changed from 50 W to 150 W.
Figure 7B:
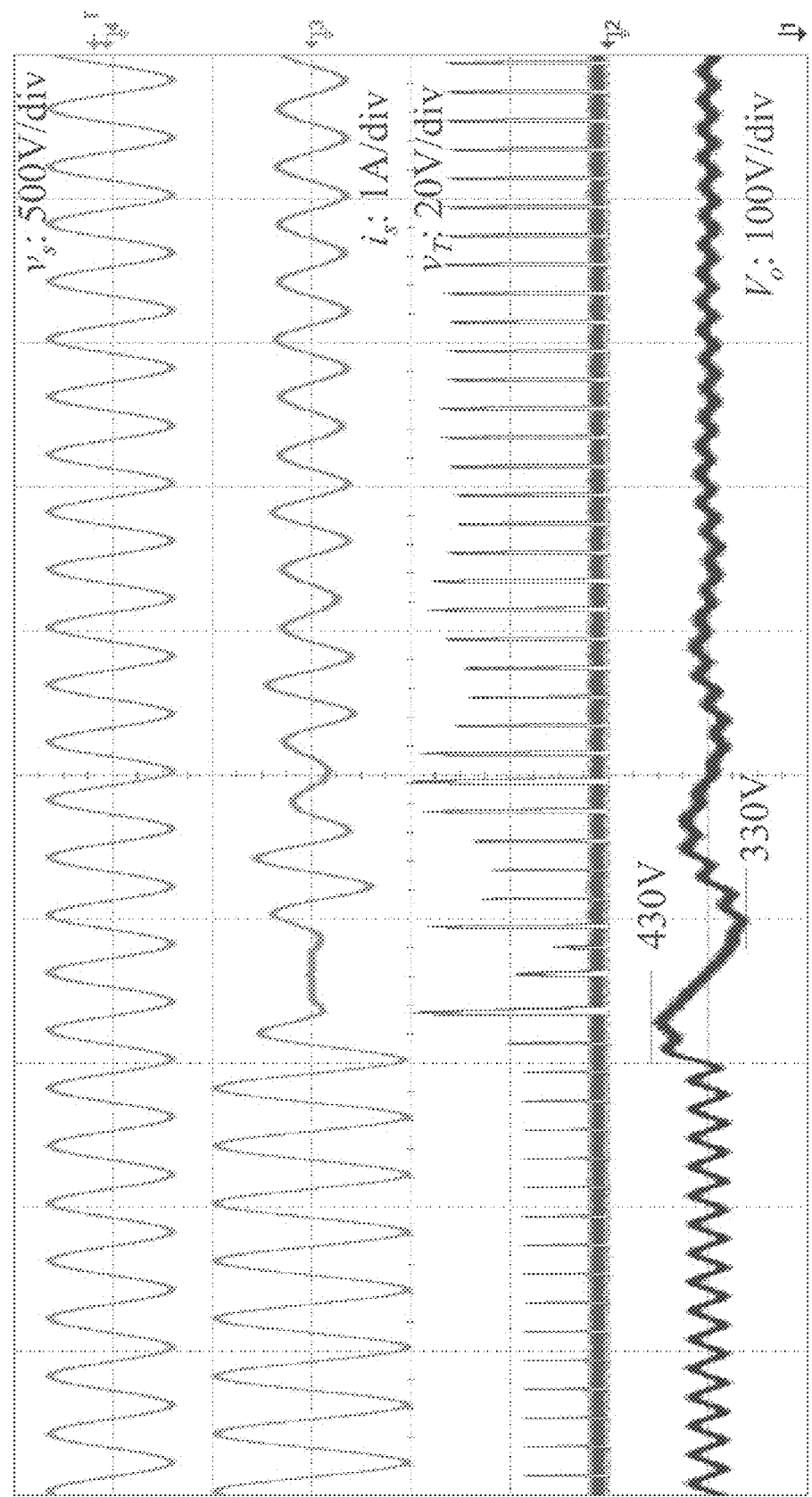
FIG. 7B is a plot showing the waveforms and the transient response of $i_S$, $v_s$, $v_T$ and $v_o$ of the power electronic system of FIG. 3B during a power conversion process when the load power is changed from 150 W to 50 W.

With reference to FIGS. 7A and 7B, there is shown the transient response of the PFC converter when the load power is changed. FIG. 7A shows the waveform for power changed from 50 W to 150 W. The output voltage has a minimum value 330V and maximum value 430V during the load change. FIG. 7B shows the waveform for power changed from 150 W to 50 W. The output voltage has a minimum value 340V and maximum value 430V during the load change. Both output voltages are successfully regulated back to the original value 380V after the transient.

Figure 8:
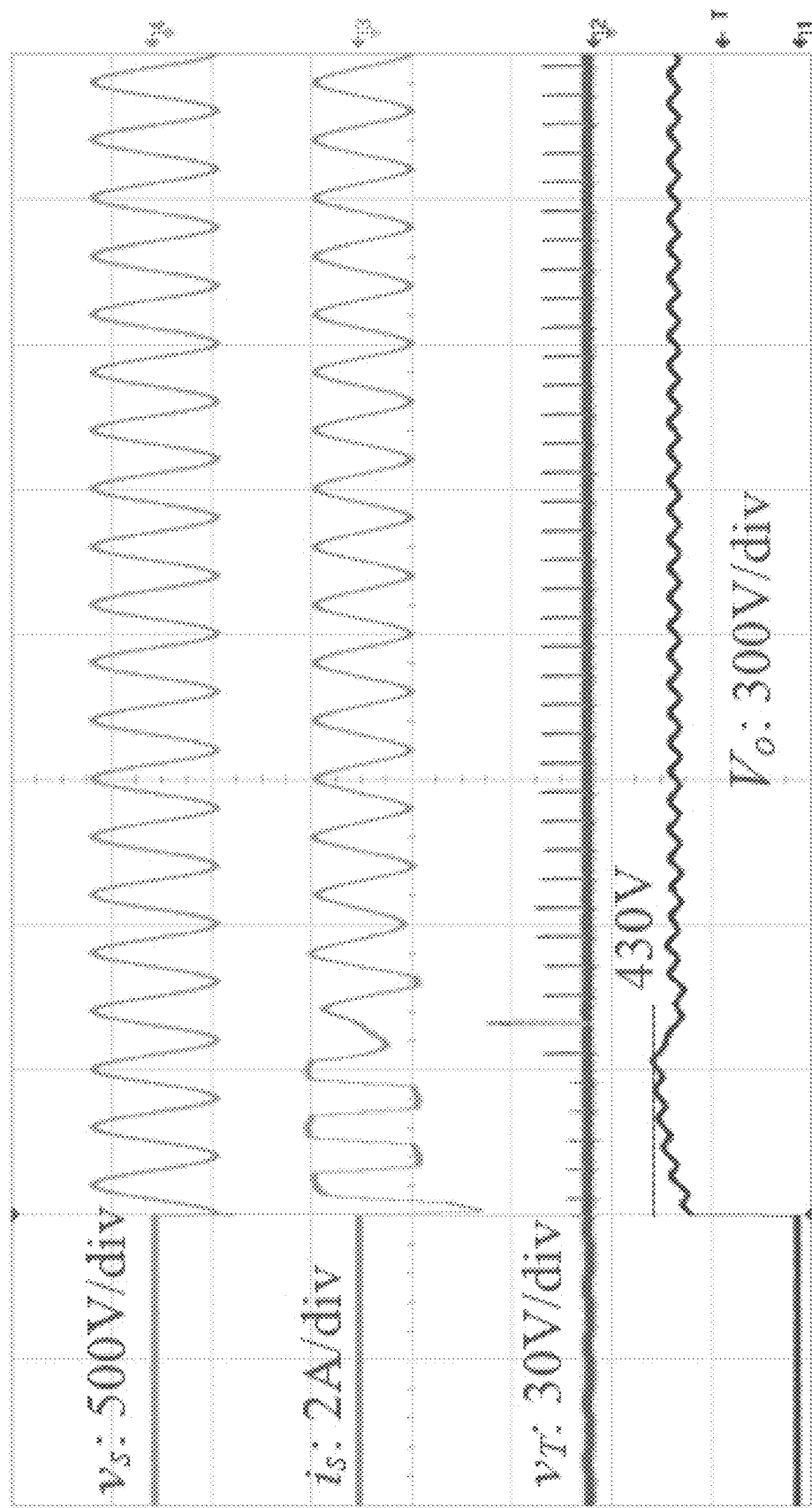
FIG. 8 is a plot showing the waveforms and the transient response of $i_S$, $v_s$, $v_T$ and $v_o$ of the power electronic system of FIG. 3B starting up with full loading.

Referring to FIG. 8, the power electronic system with the PFC converter is started up with full load (150 W) condition. The output voltage rises to maximum 430V and is regulated back to steady value 380V.

Figure 9:
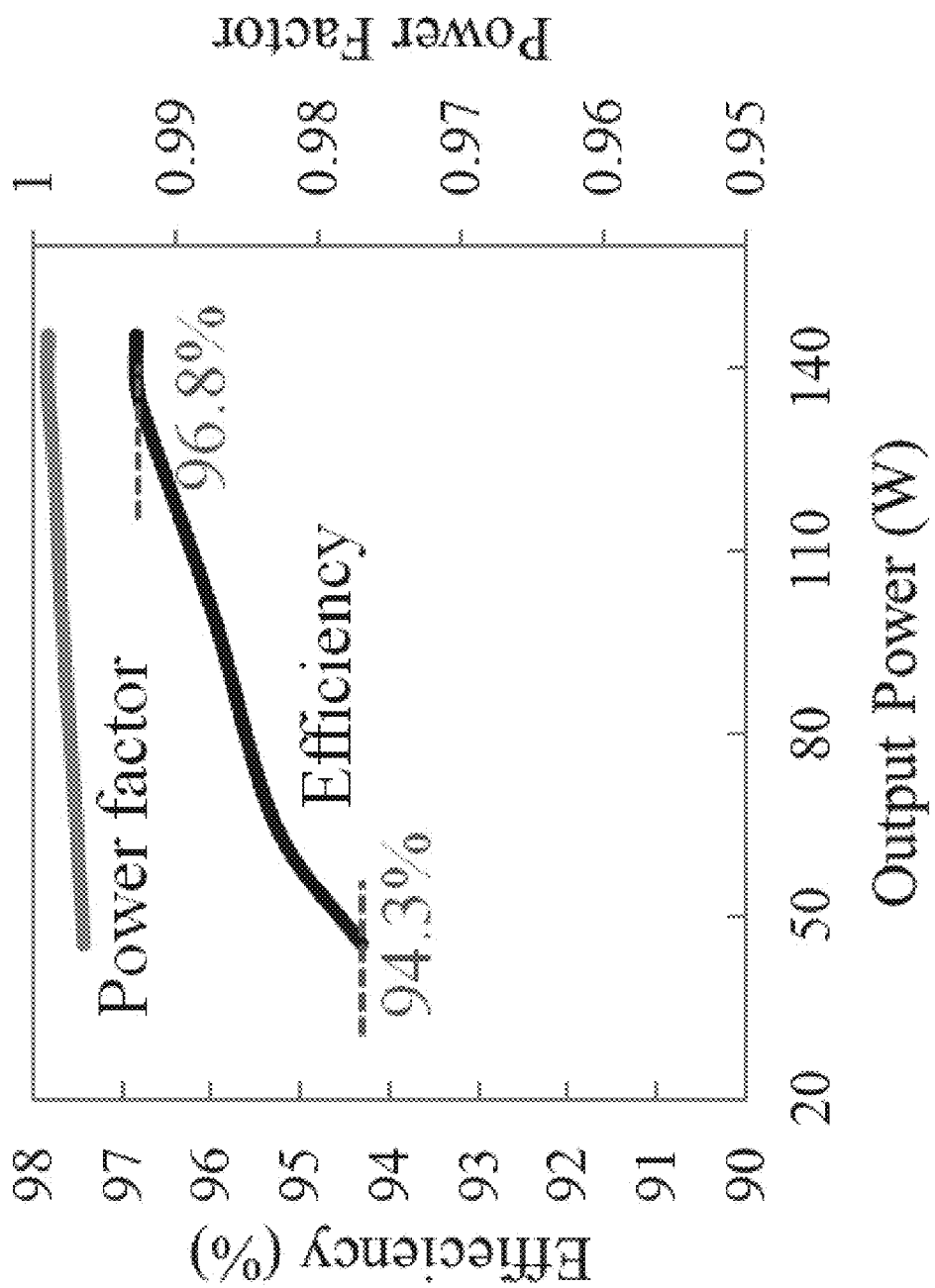
FIG. 9 is a plot showing the efficiency and the power factor vs output power of the power electronic system of FIG. 3B.

With reference to FIG. 9, the power factor and efficiency of the converter is shown. Results reveal that the power converter with the PFC converter is able to provide a power factor greater than 0.995 among different output power. The efficiency is 96.8% at 140 W and 94.3% at 50 W.

Without deviating from the spirit of the invention, the power factor correction circuit for a power electronic system can be implemented to correct power factor in other electronic device or circuits, such as a power converting stage in an electrical apparatus or an electronic device, or each of the power converting stage in the electrical apparatus. In some other embodiments, the power factor correction circuit may also used for improving PF and reducing THD of an electric load with frequent variation in power consumption.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A power factor correction circuit for a power electronic system comprising:
   a feedback circuit connected between an output of a power converter and an input to one or more switches of the power converter, the feedback circuit comprising:
      a series-pass device connected in series between an electrical power source and the power converter, wherein the series-pass device is selectively controlled to effect control of one or more operation parameters of the one or more switches to thereby control an input characteristic of the electrical power source and the power converter;
      a voltage sensor arranged to sense a voltage across the series-pass device for controlling the one or more operation parameters of the one or more switches;
      a voltage comparator arranged to compare the sensed voltage across the series-pass device with a first reference voltage, and to output a voltage for controlling the one or more operation parameters of the one or more switches; and
      a control mechanism arranged to control an operation of the series-pass device during a power conversion process, so as to increase a power factor of the power electronic system and to reduce a harmonic distortion generated by the power converter to an electrical current supplied by the electrical power source in the power electronic system;
   wherein the input characteristic includes an input current waveform of the electrical current supplied by the electrical power source to the power converter.

2. The power factor correction circuit for a power electronic system in accordance with claim 1, wherein the series-pass device is a bipolar junction transistor.

3. The power factor correction circuit for a power electronic system in accordance with claim 1, wherein the series-pass device is arranged to operate in an active region of a current-voltage characteristic of the series-pass device.

4. The power factor correction circuit for a power electronic system in accordance with claim 3, wherein an operating point of the series-pass device is regulated at boundaries between the active region and a saturation region of a current-voltage characteristic of the series-pass device.

5. The power factor correction circuit for a power electronic system in accordance with claim 1, wherein the control mechanism is a feedback mechanism arranged to receive an output voltage of the power converter and to generate an input signal for the series-pass device so as to control the input characteristic of the power converter.

6. The power factor correction circuit for a power electronic system in accordance with claim 5, wherein the feedback mechanism includes a first error amplifier arranged to compare the output voltage of the power converter with a second reference voltage.

7. The power factor correction circuit for a power electronic system in accordance with claim 6, wherein the second reference voltage equals to a predetermined output voltage of the power converter.

8. The power factor correction circuit for a power electronic system in accordance with claim 6, wherein the feedback mechanism further comprises a second error amplifier arranged to compare an input current with a reference input current obtained by multiplying an output of the first error amplifier with a sensed input voltage of the power converter.

9. The power factor correction circuit for a power electronic system in accordance with claim 8, wherein the first error amplifier and/or the second error amplifier is a proportional-plus-integral controller.

10. The power factor correction circuit for a power electronic system in accordance with claim 1, wherein an input capacitor is connected in parallel to the power converter to absorb a high-frequency current pulse generated by the power converter.

11. The power factor correction circuit for a power electronic system in accordance with claim 10, wherein the input capacitor is a film type capacitor.

12. The power factor correction circuit for a power electronic system in accordance with claim 1, wherein the input characteristic of the power converter includes an input voltage of the power converter.

13. The power factor correction circuit for a power electronic system in accordance with claim 12, wherein a switch driver is also arranged to control a switching frequency and/or a duty cycle of the input voltage of the power converter.

14. The power factor correction circuit for a power electronic system in accordance with claim 1, wherein the first reference voltage is slightly greater than a saturation voltage of the series-pass device.

15. The power factor correction circuit for a power electronic system in accordance with claim 1, wherein the power converter is an AC-DC converter.

16. The power factor correction circuit for a power electronic system in accordance with claim 1, wherein the power converter is a switching converter.

17. The power factor correction circuit for a power electronic system in accordance with claim 1, wherein the power converter is a boost converter.

18. The power factor correction circuit for a power electronic system in accordance with claim 17, wherein the boost converter operates at a discontinuous conduction mode.

19. The power factor correction circuit for a power electronic system in accordance with claim 1, further comprises a monolithically integrated structure.

20. The power factor correction circuit for a power electronic system in accordance with claim 1, wherein the series pass device is further arranged to filter a noise signal generated by the power converter from reaching the power source of the power electronic system.

21. An electrical power switching converter for a power electronic system, comprising:
  a switching network including one or more switches arranged to process an input electrical power between an electrical power source and an electrical load;
  a power factor correction circuit including a feedback circuit connected between an output of the electrical power switching converter and an input to the one or more switches of the switching network, the feedback circuit comprises:
    a series-pass device connected in series between the electrical power source and the switching network such that the series-pass device is selectively controlled to effect control of one or more operation parameters of the one or more switches of the switching network to thereby control an input characteristic of the electrical power source and the switching network;
    a voltage sensor arranged to sense a voltage across the series-pass device for controlling the one or more operation parameters of the one or more switches;
    a voltage comparator arranged to compare the sensed voltage across the series-pass device with a reference voltage, and to output a voltage for controlling the one of more operation parameters of the one or more switches; and
    a control mechanism arranged to control an operation of the series-pass device during a power conversion process, so as to increase a power factor of the power electronic system and to reduce a harmonic distortion generated by the electrical power switching converter to an electrical current supplied by the electrical power source in the power electronic system; and
  an output filter connected between the electrical load and the switching network;
  wherein the input characteristic includes an input current waveform of the electrical current supplied by the electrical power source to the switching network.

* * * * *